(12) United States Patent
Wang

(10) Patent No.: US 8,698,824 B1
(45) Date of Patent: Apr. 15, 2014

(54) COMPUTING SYSTEMS, DEVICES AND METHODS FOR RENDERING MAPS REMOTE FROM A HOST APPLICATION

(71) Applicant: Google Inc., Mountain View, CA (US)

(72) Inventor: Zheng Wang, Arncliffe (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/861,614

(22) Filed: Apr. 12, 2013

(51) Int. Cl.
*G06F 13/00* (2006.01)
*G06F 15/167* (2006.01)
*G06T 15/00* (2011.01)

(52) U.S. Cl.
USPC ............ 345/537; 345/536; 345/541; 345/522

(58) Field of Classification Search
None
See application file for complete search history.

(56) References Cited

U.S. PATENT DOCUMENTS

| | | | |
|---|---|---|---|
| 2010/0020091 A1* | 1/2010 | Rasmussen et al. | 345/582 |
| 2012/0098840 A1* | 4/2012 | Kelley et al. | 345/502 |
| 2013/0120411 A1* | 5/2013 | Swift et al. | 345/505 |

OTHER PUBLICATIONS

Shreiner, OpenGL Programming Guide: The Official Guide to Learning OpenGL, Versions 3.0 and 3.1, Seventh Edition, Addison-Wesley Professional, Jul. 21, 2009.*

* cited by examiner

*Primary Examiner* — Maurice L McDowell, Jr.
*Assistant Examiner* — Donna J Ricks
(74) *Attorney, Agent, or Firm* — Marshall, Gerstein & Borun LLP

(57) ABSTRACT

The present disclosure relates to rendering interactive displays remote from a host application. More specifically, the present disclosure relates to rendering interactive displays, such as interactive geographic map displays and computer game displays, remote from a corresponding host application, such as a web page for a municipality, a university, a computer game, a business, etc., that generates a display which includes the remotely rendered interactive display.

22 Claims, 8 Drawing Sheets

US 8,698,824 B1

COMPUTING SYSTEMS, DEVICES AND METHODS FOR RENDERING MAPS REMOTE FROM A HOST APPLICATION

FIELD OF THE INVENTION

The present disclosure relates to rendering interactive displays remotely from a corresponding host application. More specifically, the present disclosure relates to rendering an interactive display, such as an interactive geographic map display, using a dynamic rendering application that is separate from a corresponding host application.

BACKGROUND

Host applications, such as applications associated with web pages, often include interactive displays, such as interactive geographic map displays and computer game displays. The interactive displays cooperate with a user input device to facilitate user interaction with the associated host application. Interactive displays may be rendered locally as an integral portion of an associated host application using data that is retrieved from a remote data source. Alternatively, an interactive display may be rendered locally as an integral portion of an associated application using data that is stored locally.

Geographic mapping applications represent some of the most frequently used computer-based applications. Non-interactive geographic map displays are often statically generated as an integral portion of a host application, such as applications associated with web pages related to municipalities, businesses, universities, resorts, landmarks, nature areas, parks, computer games, etc., in lieu of providing interactive displays.

Rendering interactive displays locally, as an integral portion of an associated host application, requires adding a significant amount of display rendering code to the host application. Addition of display rendering code to a host application increases the amount of memory required to store the host application. Furthermore, when display rendering code is incorporated within a host application, the host application may require updating when corresponding data, used by the display rendering code to render a display, is updated.

SUMMARY

A map may be displayed in a first (host) application executing on a computing device, but completely rendered by a second (renderer) application executing on the computing device. A static library of the host application may contain code that: 1) sets up a surface for drawing a map (e.g., a, OpenGL surface) on the computing device; 2) forwards all the user interactions with the surface (e.g., events such as touch, pan, zoom, etc.) to the renderer application; 3) receives commands (e.g., OpenGL rendering commands) from the renderer application and draws the map on the surface; and 4) provides a set of API that forwards the calls (e.g., using Android inter-process communication (IPC) or any other communication that would provide an interactive and fast user experience) to the renderer application, such as an API, to add markers and other graphical elements to the drawn map. The static library may be a "dump player" that performs forward actions for the events and API calls on the host application, then plays the commands from the renderer application. The renderer application may be a regular application that allows any host or third-party application to connect to it and render (i.e., convert received vector data into drawing commands) the contents of a map. The renderer application also keeps track of the state of a map (e.g., what markers have been added, the position and zoom of the map, any polylines that have been added, what other elements have been added to the map, etc.) so that any changes or updates to the map may be added without losing the previous data.

Essentially, one part of the host application may be completely rendered by the renderer application that is outside of the control of the host application. This may allow the host application to be smaller in size because the static library may be small, and any errors or updates to the renderer may be added without interfering with the host application. Further, the rendering surface may be a canvas within any application to display interactive surfaces other than maps.

A method may incorporate interactive geographic map displays within interfaces of applications executing on a computing device. The method may retrieve map data corresponding to a map portion from a map database via a computer network. The map data may include specifications for a plurality of elements to display within the map portion. The method may also generate a set of commands using a map rendering module to render the map portion using the retrieved map data and generate a display rendering surface within a graphical interface of a host application executing on the computing device using instructions of a static library of a host application. The method may further draw the map portion within the display rendering surface using the set of commands and the instructions of the host application static library. The map rendering module may be stored in a first memory of the computing device and the host application with the static library may be stored in a second memory of the computing device.

In another embodiment, a method for rendering a map within a host application by a rendering application includes generating a display area within a user interface of a host application. The host application is stored in a first memory of a computing device and the host application includes a static library. The method further includes generating a drawing surface within the display area using the static library. The method also includes rendering the map portion using a rendering application stored in a second memory of the computing device. The method further includes drawing the map portion within the drawing surface of the display using the rendered map portion. The host application with static library and the rendering application cooperate to draw the map portion within the drawing surface of the display.

In another embodiment, a computing device configured for rendering a map portion within a user interface display includes a display device configured to present the user interface display. The computing device also includes a host application with static library module stored in a first memory of the computing device. The host application including instructions that, when executed on a processor of the computing device, generate a drawing surface within the user interface display using the static library module. The computing device further includes a map rendering module stored in a second memory of the computing device, wherein the map rendering module includes instructions that, when executed on a processor of the computing device, render the map portion. The computing device also includes a map portion drawing module stored on a memory that, when executed on a processor, draws the rendered map portion within the drawing surface of the display.

In a further embodiment, a tangible computer-readable medium including non-transitory computer readable instructions stored thereon for incorporating a map portion within a display associated with a host application includes a static library module that, when executed on a processor, generates a drawing surface within the display and causes a rendering application to create rendered map portion data. The tangible computer-readable medium also includes a rendered map portion data retrieval module that, when executed on a processor, retrieves the rendered map portion data. The tangible computer-readable medium further includes a map portion drawing module that, when executed on a processor, draws the map portion within the drawing surface of the display using the rendered map portion data.

In a still further embodiment, an apparatus may incorporate interactive geographic map displays within interfaces of applications executing on a computing device. Retrieval means may retrieve map data corresponding to a map portion from a map database via a computer network. The map data may include specifications for a plurality of elements to display within the map portion. Generating means may generate a set of commands using a map rendering module to render the map portion using the retrieved map data and generate a display rendering surface within a graphical interface of a host application executing on the computing device using instructions of a static library of a host application. Drawing means may further draw the map portion within the display rendering surface using the set of commands and the instructions of the host application static library. The map rendering module may be stored in a first memory of the computing device and the host application with the static library may be stored in a second memory of the computing device.

In another embodiment, means for incorporating a map portion within a display associated with host application means includes static library means that generates a drawing surface within the display and causes rendering application means to create rendered map portion data. Means for incorporating a map portion within a display associated with host application means also includes rendered map portion data retrieval means for retrieving the rendered map portion data. Means for incorporating the map portion within a display associated with host application means further includes map portion drawing means that draws the map portion within the drawing surface of the display using the rendered map portion data.

The features and advantages described in this summary and the following detailed description are not all-inclusive. Many additional features and advantages will be apparent to one of ordinary skill in the art in view of the drawings, specification, and claims hereof.

DETAILED DESCRIPTION

The systems, devices and methods of the present disclosure incorporate a static library within host applications, such as host applications associated with web pages for universities, municipalities, businesses, computer games, etc., which integrate map portions that are rendered by a rendering application that is separate from the host application. Corresponding map portion rendering code is incorporated in the rendering application. Thereby, the host application does not require map portion rendering code.

Generally, a map portion, in combination with a user input device (e.g., a touch screen display or a mouse), facilitates user interaction with a corresponding host application. For example, a host application associated with a university may generate a web page for display on touch screen display. A map portion, such as an interactive geographic map display, may be included within the web page display. The map portion (e.g., interactive geographic map display) may include a navigation interface overlaying the geographic map. When, for example, a user touches the touch screen display (i.e., interacts with the display) proximate the navigation interface, the geographic map display portion may zoom into a specific potion of the geographic map. More broadly, the user may interact with the map portion (e.g., the interactive geographic display portion) to obtain geographically related information in regard to the university.

The static libraries of the present disclosure require a relatively small amount of memory in comparison to the memory required to store rendering code associated with rendering interactive displays. Advantageously, host applications, implementing the static libraries of the present disclosure, retain interactive features, such as touch, tap, zooming, panning, searching, marker adding, etc., associated with maps. A further advantage of the static libraries of the present disclosure is that a plurality of host applications, which individually incorporate a static library, may receive rendered map data from a rendering application that is separate from any one of the plurality of host applications.

Figure 8:
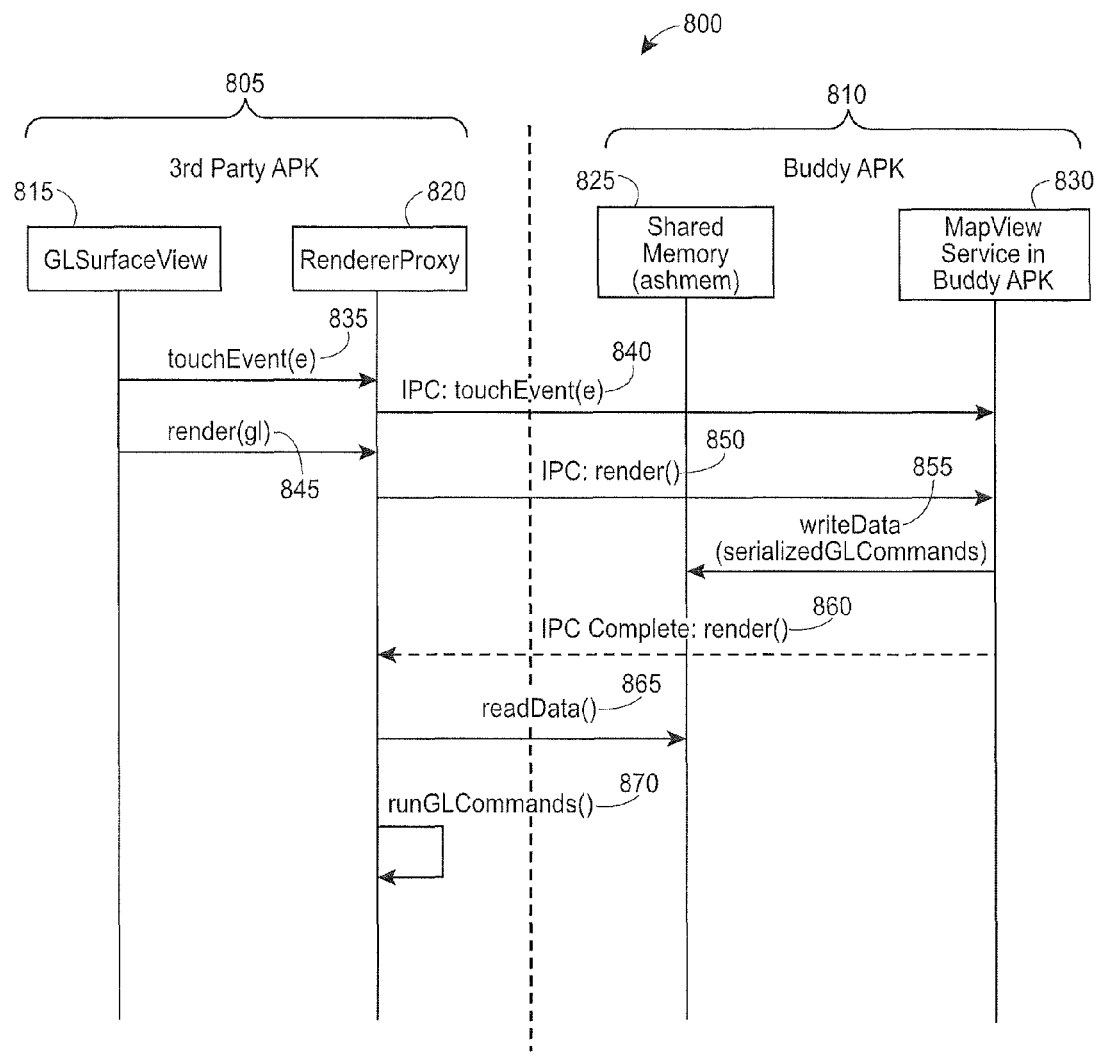
FIGS. 8-10 depict example sequence diagrams for incorporating a map portion, rendered by a rendering application, within a display associated with a host application.
Figure 9:
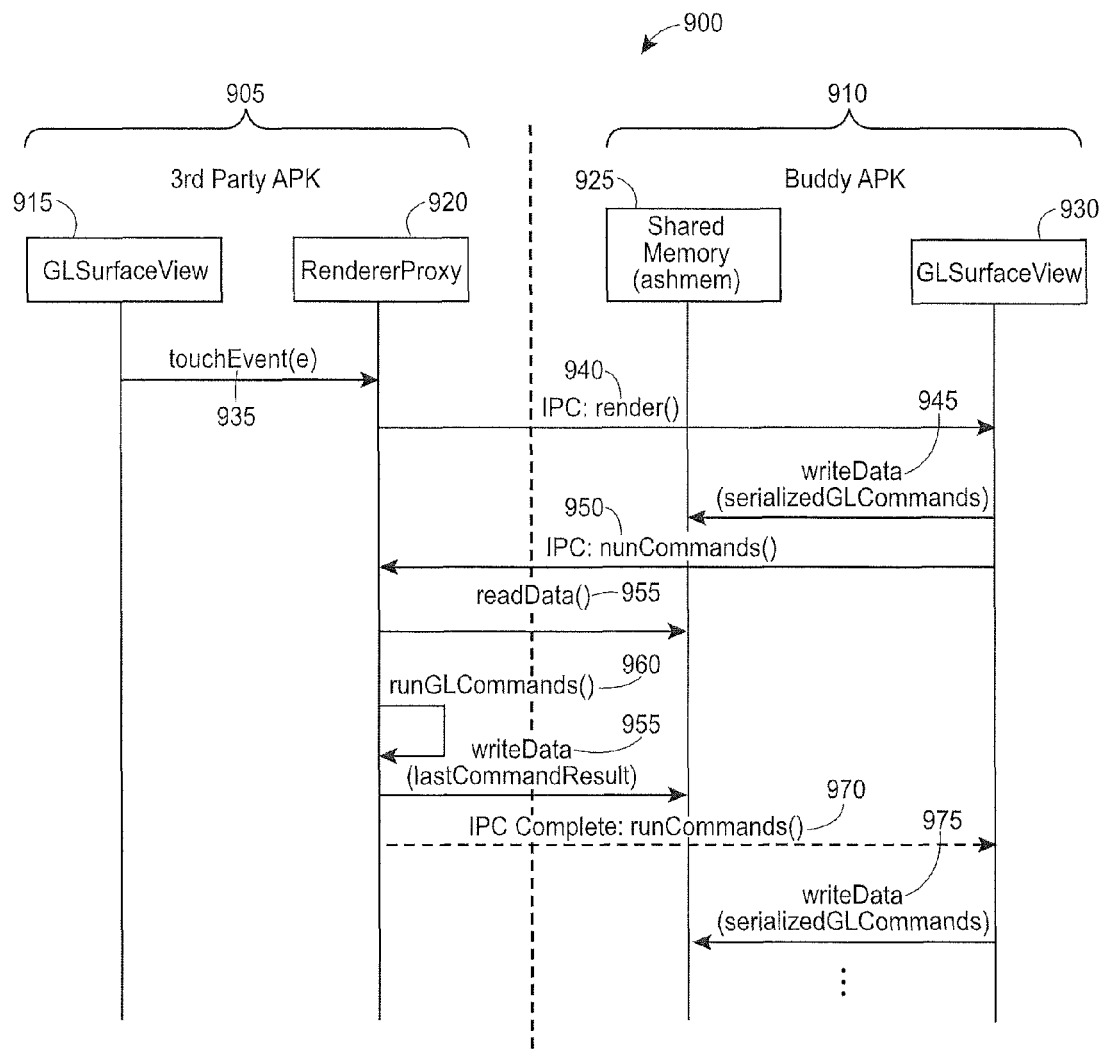

Generally, the static libraries of the present disclosure, which are described in detail herein with reference to FIGS. 8-9, include instructions that generate a display rendering surface (e.g., an open graphics library (OpenGL) surface, an Android canvas, etc.) within a display which is generated by an associated host application. The static libraries also forward user interaction events to a rendering application that is separate from the host application, receive display rendering commands from the rendering application and provide a set of application programming interfaces (APIs) that forward drawing calls to the rendering application.

With implementation of the static libraries of the present disclosure, display rendering code associated with fetching display data, implementing the associated display drawing operations and responding to interaction events on a corresponding display, such as touch and tap events, is not needed within the host application. Advantageously, when the display rendering code is not incorporated in a host application, the display rendering code may be updated without changing the host application.

Figure 1:
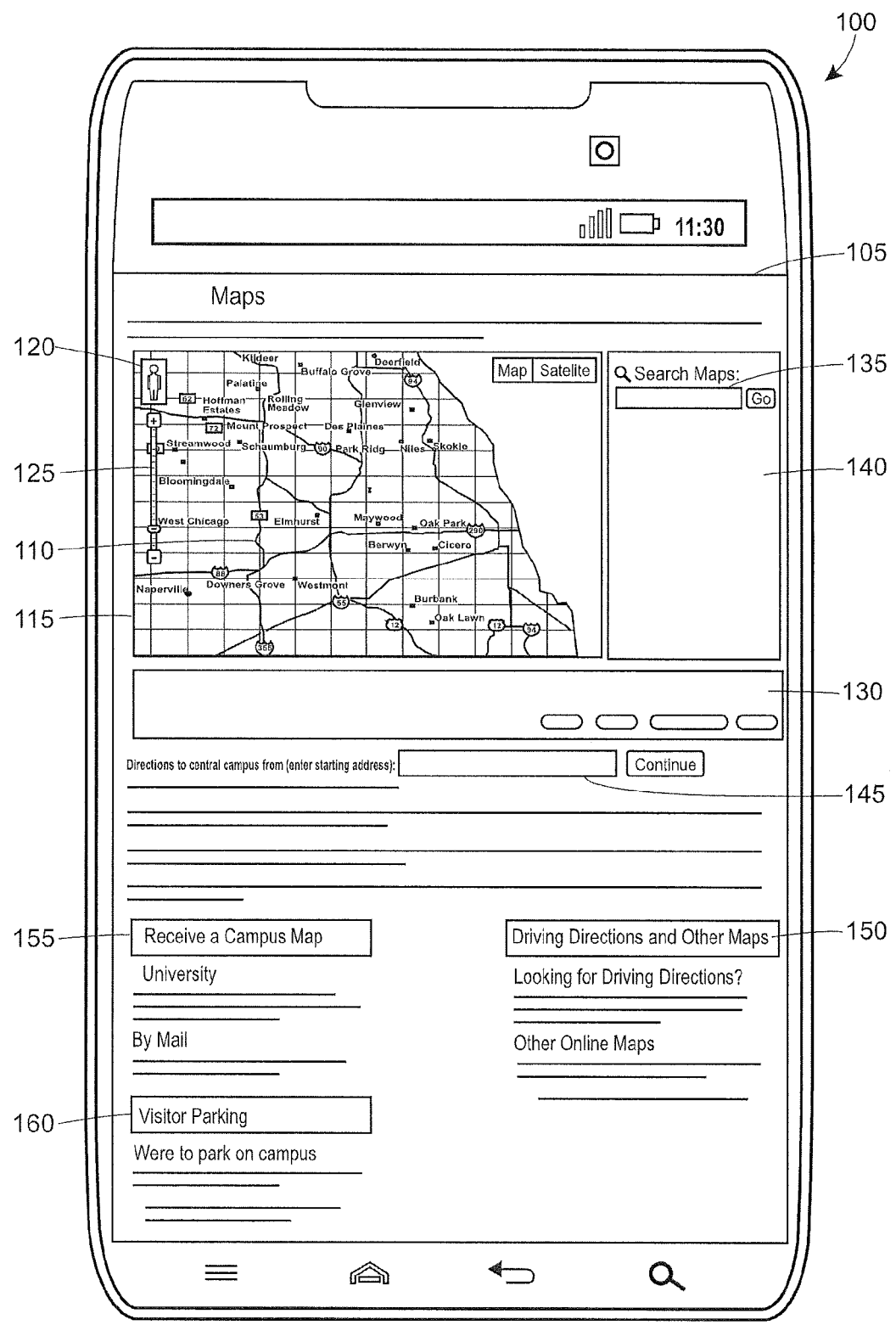
FIG. 1 depicts an example client device including a display associated with a host application having an interactive display or map portion rendered by a rendering application.
Figure 2:
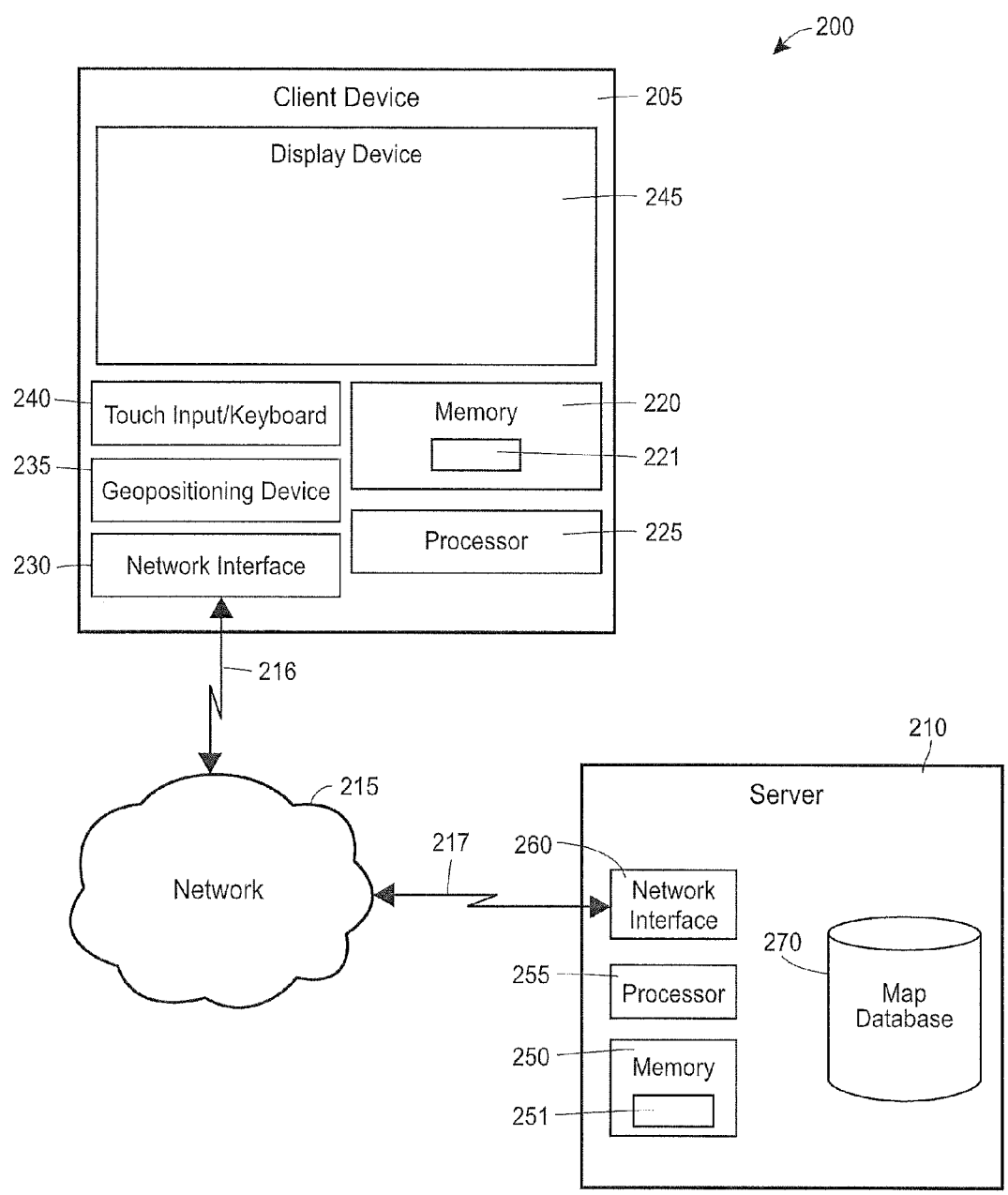
FIG. 2 depicts a high-level block diagram of an example of a computer system for implementing rendering a map portion with a rendering application and incorporating the rendered map portion within a display associated with a host application.

FIG. 1 illustrates an example client device 100 including a display 105 (e.g., a university web page) depicted on an associated display device (e.g., display device 245 of FIG. 2). A host application may generate the display 105. The display 105 may include a map portion 110 (e.g., an interactive geographic map) within a drawing surface 115. As described in detail herein, the host application implements a static library (e.g., static library 805, 905, 1005 of FIGS. 8, 9 and 10, respectively) to generate the drawing surface 115 and to send commands to a rendering application (e.g., rendering application 810, 910, 1010 of FIGS. 8, 9 and 10, respectively) that is separate from the host application. As described in detail herein with reference to FIGS. 9-10, the rendering application 810, 910, 1010 may render the map portion 110 in response to receiving commands from the host application with static library 805, 905, 1005. The host application, further implementing a static library 805, 905, 1005, may receive display rendering commands from the rendering application 810, 910, 1010 and draw the map portion 110 within the drawing surface 115.

With further reference to FIG. 1, the display 105 may include map portion view selection interface 120 that allows a user of the client device 100 to select a desired view (e.g., an aerial view or a street level view) of the map portion 110. The display 105 may further include a navigation interface 125 overlaying the map portion 110. The navigation interface 125, in cooperation with a user input device (e.g., user input device 240 of FIG. 2) may allow a user to navigate around, and otherwise interact with, the map portion 110. The display 105 may also include a feature selection area 130 which may include a plurality of features, such as information booths, parking lots, student housing, fraternity houses, libraries, etc. Each of the features may include an associated click box, for example, which a user of the client device 100 may select. When the corresponding box is selected by the user, an associated feature (or marker) is displayed overlaying the map portion 110. The display 105 may also include a map search interface 135 that enables a user to enter various search information via a user input device 240, such as a name of building, a street name, etc. When the host application finds a matching feature corresponding to the search information, the matching feature (or marker) may be displayed overlaying the map portion 110. The display 110 may further include a side bar 140 which may, for example, include a list of related items, such as related geographic locations, sister campuses, airports in the vicinity, hotels, etc. When a user selects any one of the items from the side bar 140, the map portion 110 may be dynamically revised to depict information, such as a map, related to the selected item. The display 105 may also include an information entry space 145 which allows a user to enter, for example, a street address. When the user enters a street address, the map portion 110 may display directions from the street address to central campus, for example.

With yet further reference to FIG. 1, the display 105 may include a driving directions and other maps selection 150 which allows a user to obtain desired directions and associated maps. The display 105 may also include receive a map selection 155 which allows a user to indicate her desire to obtain a map. The display 105 may further include a visitor parking selection 160 which allows a user to obtain information related to parking lots for use by visitors. For example, the visitor parking lots may be highlighted within a geographic map display within the map portion 110.

The details associated with a computer system 200 for rendering a map using a rendering application separate from a host application are now described beginning with reference to FIG. 2. FIG. 2 depicts a high-level block diagram of a computer system 200 that implements communications between a client device 205 and a remote computing device 210 to provide information to a user of the client device 205. The client device 205 is communicatively coupled to the remote computing device 210 via a network 215.

For clarity, only one client device 205 is depicted in FIG. 2. While FIG. 2 depicts only one client device 205, it should be understood that any number of client devices 205 may be supported and that each client device 205 may be any appropriate computing device, such as a desk-top computer, a mobile telephone, a personal data assistant, a lap-top computer, a vehicle-based computer system, etc. The client device 205 may include a memory 220 and a processor 225 for storing and executing, respectively, a module 221. The module 221, stored in the memory 220 as a set of computer-readable instructions, may be related to a host application (e.g., the host application associated with the display 105 of FIG. 1), a static library 805, 905, 1005 and a rendering application 810, 910, 1010 that, when executed on a processor 225, causes a map portion 110 to be rendered by the rendering application 810, 910, 1010. As described in detail herein, the static library 805, 905, 1005 facilitates interaction between the host application and the rendering application 810, 910, 1010. As further described herein with reference to FIGS. 8-10, a portion of the memory 220 may be shared by the host application with static library 805, 905, 1005 and a rendering application 810, 910, 1010.

The processor 225, further executing the module 221, may cause the rendering application 810, 910, 1010 to retrieve map data (e.g., map data 310 of FIG. 3) from a map database 270. The rendering application 810, 910, 1010 may render a map portion 110 based on the map data 310 retrieved from the map database 270. A host application with static library 805, 905, 1005, cooperating with the rendering application 810, 910, 1010, may draw the map portion 110 within the drawing surface 115.

The processor 225, further executing the module 221, may facilitate communications between the computing device 210 and the client device 205 via a network interface 230, a client device network connection 216 and the network 215. The client device 205 may also include a geopositioning device 235, such as a global positioning system receiver or a WiFi positioning device for determining a geographic location of the client device 205. The client device 205 may include a display device 245 which may be any type of electronic display device such as a liquid crystal display (LCD), a light emitting diode (LED) display, a plasma display, a cathode ray tube (CRT) display, or any other type of known or suitable electronic display. The display device 245 may exhibit a display 105 which depicts a map portion 110 within a drawing surface 115 of the display 105. The client device 205 may include a user input device 240, such as a touch input/keyboard that provides a mechanism for a user of the client device 210 to launch a host application, to enter related information and to interact with a map portion 110. The user input device 240 may be configured as an integral part of a display device 245, such as a touch screen display device. The network interface 230 may be configured to facilitate communications between the client device 205 and the remote computing device 210 via any hardwired or wireless communication network 215, including for example a hardwired Ethernet connection or a wireless LAN, MAN or WAN, WiFi, the Internet, or any combination thereof. Moreover, the client device 205 may be communicatively connected to the remote computing device 210 via any suitable communication system, such as via any publicly available or privately owned communication network, including those that use wireless communication structures, such as wireless communication networks, including for example, wireless LANs and WANs, satellite and cellular phone communication systems, etc.

The computing device 210 may include a memory 250 and a processor 255 for storing and executing, respectively, a module 251. The module 251, stored in the memory 250 as a set of computer-readable instructions, facilitates applications related to dynamically rendering a map portion 110. The module 251 may also facilitate communications between the computing device 210 and the client device 205 via a network interface 260, a remote computing device network connection 217 and the network 215 and other functions and instructions.

The computing device 210 may also include an interactive display or map database 270, such as a geographic map database having data (e.g., interactive display data or map data 310 of FIG. 3) representative of a geographic map and associated map features. While the map database 270 is shown in FIG. 2 as being contained within the remote computing device 210, it should be understood that the map database 270 may be located within separate remote servers (or any other suitable computing devices) communicatively coupled to the network 215 and, or the client device 205. Optionally, portions of the display database 270 may be associated with memories that are separate from one another, such as a memory 220 of the client device 205.

Figure 3:
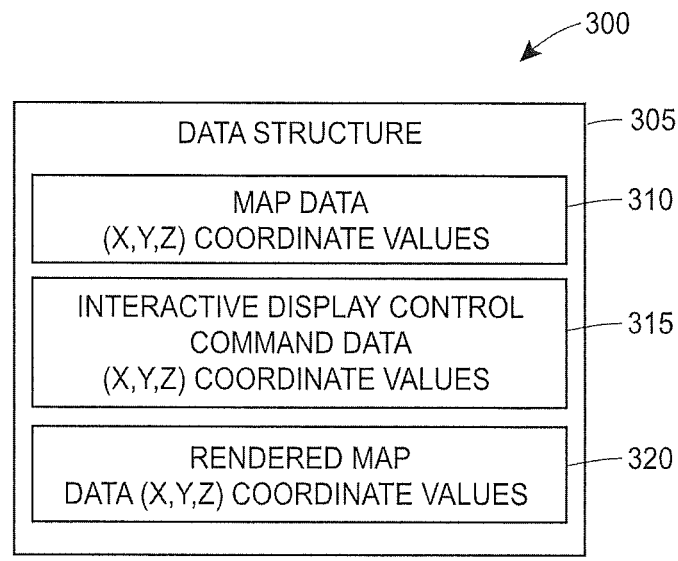
FIG. 3 depicts an example data structure related to incorporating a map portion, rendered by a rendering application, within a display associated with a host application.

Turning now to FIG. 3, a block diagram 300 of a data structure 305 is depicted. At least portions of the data structure 305 may be retrieved or transmitted when the processor 225 executes any one of the modules 221, 420-495 or when the processor 255 executes any one of the modules 251, 550-590. The data structure 305 may include map data 310 representative of a map 110. The map data 310 may include geographic map data having various features and coordinate values (e.g., x, y, z coordinates indicating positions) that define relative locations, municipalities, counties, states, continents, roadways, bike paths, sidewalks, oceans, lakes, rivers, waterways, etc. Alternatively, map data 310 may include data representative of various interactive scenes within a computer game or any other interactive display.

The data structure 305 may also include user input data or interactive display control command data 315 representative of commands, events and user inputs 120-150 associated with user interaction with a map 110 generated by an associated host application. For example, the interactive display control command data 315 may include events or user inputs associated with an interactive geographic map portion 110. Alternatively, the interactive display command data 315 may include data representative of commands associated with user interaction with a computer game or any user inputs associated with a map 110. The data structure 305 may further include rendered map data 320, such as data representative of a rendered interactive geographic map display 110 or an interactive scene associated with a computer game or any other rendered interactive display.

Figure 4:
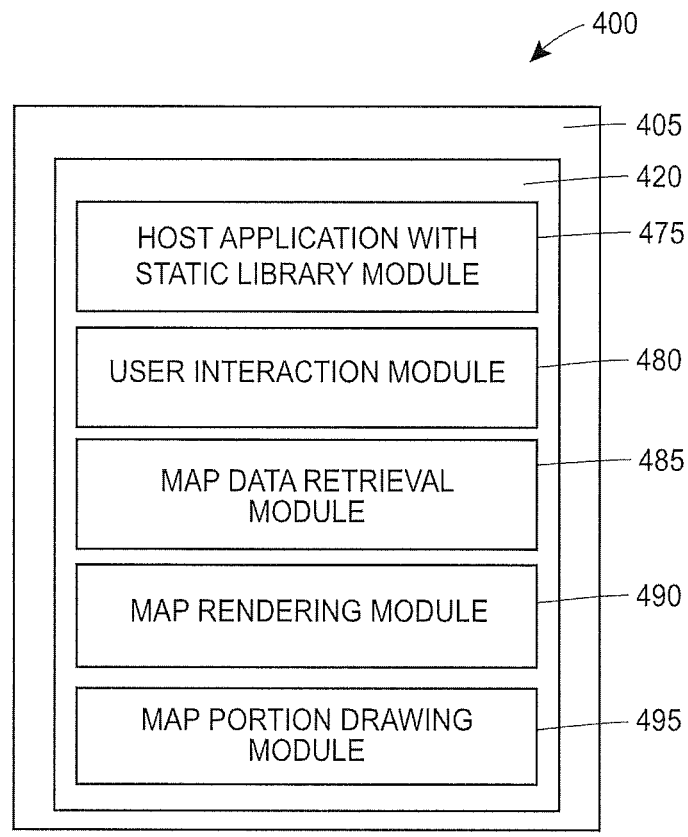
FIG. 4 depicts a block diagram of an example client device including various modules for implementing incorporation of a map portion, rendered by a rendering application, within a display associated with a host application.

Turning now to FIG. 4, a block diagram 400 of a client device 405 is depicted. As described in detail herein, the client device 405 may be suitable for use as a client device 205 of FIG. 2. The client device 405 may include various modules 475-490 stored as tangible computer-executable instructions on a memory 420. A processor, similar to the processors 225, 255 of FIG. 2 may execute the instructions of the modules 475-490 to incorporate a map portion 110 within a host application display 105 and to facilitate user interaction with the map portion 110. Particularly, when a user of a host application display 105 wishes to interact with map portion 110, the processor 225 executes at least a portion of the instructions of the modules 475-490.

While the modules 475-490 may be stored on the memory 220 and implemented as a portion of the module 221, it should be understood that the modules 475-490, or a portion thereof, may be stored on the memory 250 and implemented as at least a portion of the module 251. While modules 475-490 may be executed by either processor 225 or 255, the modules 475-490 will be described herein as being executed by processor 225.

In any event, the processor 225 may execute a host application with static library module 475 in response to a user launching a host application, such as an application associated with a university web page or a computer game web page or the like. The processor 225, executing the host application with static library module 475, may establish a map drawing surface 115, such as an open graphics library (OpenGL) surface or an Android canvas, associated with a host application map portion 110 of a corresponding host application display 105. The processor 225 may execute a user interaction module 480 that, in cooperation with a user input device 240, allows a user of a host application to interact with a map portion 110 of the display 105. The user interaction module 480 may form at least a portion of a static library 805, 905, 1005.

The processor 225 may execute a map data retrieval module 485 that retrieves map data 310 from a map database 270 in a vector format. The map data 310 may include data that describes shapes, line thickness, fill colors, text labels, and other attributes of elements (e.g., roads, buildings, landmarks, borders, etc.) for display within the map portion 110. For example, the elements within a map portion 110 may be generated in a vector graphics format that specifies various geometric shapes (e.g., using mathematical descriptions of points and paths connecting the points) and indicates how the geometric shapes should be positioned for rendering the various map elements. Thus, rather than specifying each pixel that makes up a raster image of a line segment, a vector-based description within the map data 310 of the line segment may specify the two endpoints of the line segment and indicate that the two endpoints are connected by a straight line. Vector-based descriptions of map elements may be referred to in this document as vector descriptors or simply vectors, and a set of one or several vector descriptors may be referred to as vector data or map data 310.

The processor 225 may execute a map rendering module 490 that renders a map portion 110 using the retrieved map data 310. The map rendering module 490 may form at least a portion of a rendering application 810, 910, 1010. For example, rendering the retrieved map data 310 may include causing the processor 225 to generate a set of open graphics library (OpenGL) commands (e.g., serialized GL commands 855, 945 of FIGS. 8 and 9, respectively) using the retrieved map data 310.

With further reference to FIG. 4, the processor 225 may execute the map portion drawing module 495 that draws the map portion 110 within the map drawing surface 115. In one embodiment, the map portion drawing module 495 may draw the map portion 110 using the set of OpenGL commands created by the map rendering module 490. The map portion drawing module 495 may form at least a portion of a static library 805, 905, 1005. For example, the processor 225, executing the map portion drawing module 495, may draw an interactive geographic map 110, within the map drawing surface 115 using the open graphics library (OpenGL) commands 855, 945.

Figure 5:
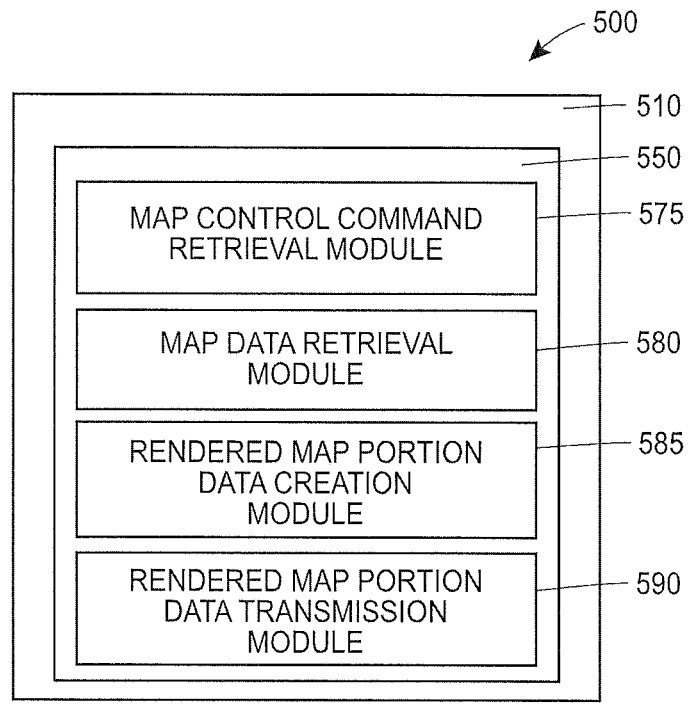
FIG. 5 depicts a block diagram of an example computer device for implementing a rendering application for rendering a map portion.

Turning now to FIG. 5, a block diagram 500 of a rendering engine 510 is depicted. As described in detail herein, the rendering engine 510 may implement various modules 575-590 stored on a memory 550. A processor, similar to the processors 225, 255 may execute the modules 575-590 to provide rendered map data 320 to a static library 805, 905, 1005 of a host application to incorporate a map portion 110 within a host application display 105. In particular, when the processor 225 executes at least a portion of the instructions of the modules 575-590, a rendering application 810, 910, 1010 may render a map portion 110 and a static library 805, 905, 1005 may draw the rendered map portion 110 within the map portion drawing surface 115.

While the modules 575-590 may be stored on the memory 220 and implemented as a portion of the module 221, it should be understood that the modules 575-590, or a portion thereof, may be stored on the memory 250 and implemented as at least a portion of the module 251. While modules 575-590 may be executed by either processor 225 or 255, the modules 575-590 will be described herein as being executed by processor 225.

In any event, the processor 255 may execute the map control command retrieval module 575 to retrieve interactive display control command data 315. The interactive display control command data 315 may be representative of various user initiated events, such as touching and tapping a corresponding touch screen display 240/245. The processor 225 may execute the map data retrieval module 580 that retrieves map data 310 from the map database 270 in response to the retrieve interactive display control command data 315.

With further reference to FIG. 5, the processor 225 may execute a rendered map data creation module 585 that creates rendered map data 320 using the retrieved map data 310. The processor 225 may execute a rendered map data transmission module 590 that transmits the rendered map data 320 to a static library 805, 905, 1005 of a host application, or a shared memory 825, 925, between the host application and the rendering engine 510 to draw the map portion 110 within the map portion drawing surface 115 of a display 105. The rendering engine 510 may track the state (e.g., markers added to an interactive geographic map display) of the map portion 110.

Figure 6:
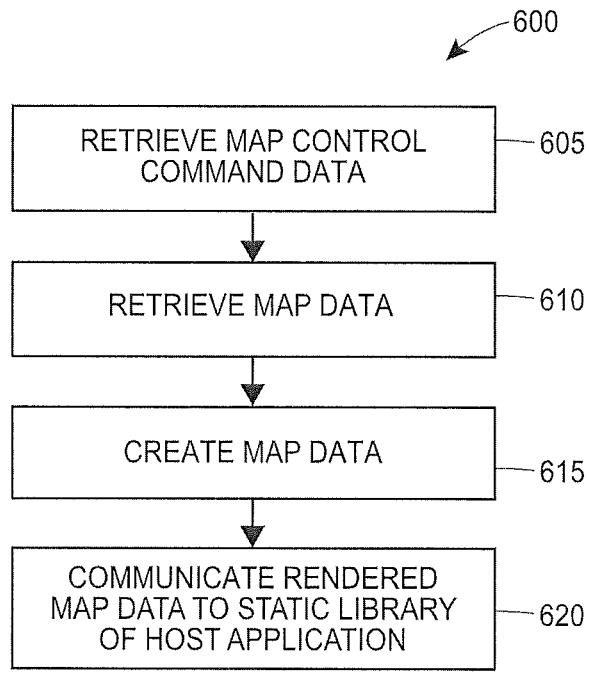
FIG. 6 depicts an example of a flow diagram for a method for incorporation of a map portion rendered by a rendering application within a display associated with a host application.

With reference now to FIG. 6, a flow diagram depicts a method 600 of rendering the map portion 110. The method 600 may be implemented within any suitable computing device, such as either of the client devices 205, 405 of FIG. 2 and FIG. 4, respectively. It should be understood that the modules 575-590 of FIG. 5 may be tangible computer-executable instructions stored on a memory and executed by a processor, similar to processor 225 of FIG. 2, to implement the method 600.

The processor 225 may retrieve interactive display control command data 315 (e.g., user input data) at block 605. The processor 225 may retrieve further map portion data 310 from the map database 270 (block 610). The processor 225 may create further rendered map data 320 (block 615). The processor 225 may communicate the further rendered map data 320 to a host application with static library (720).

Figure 7:
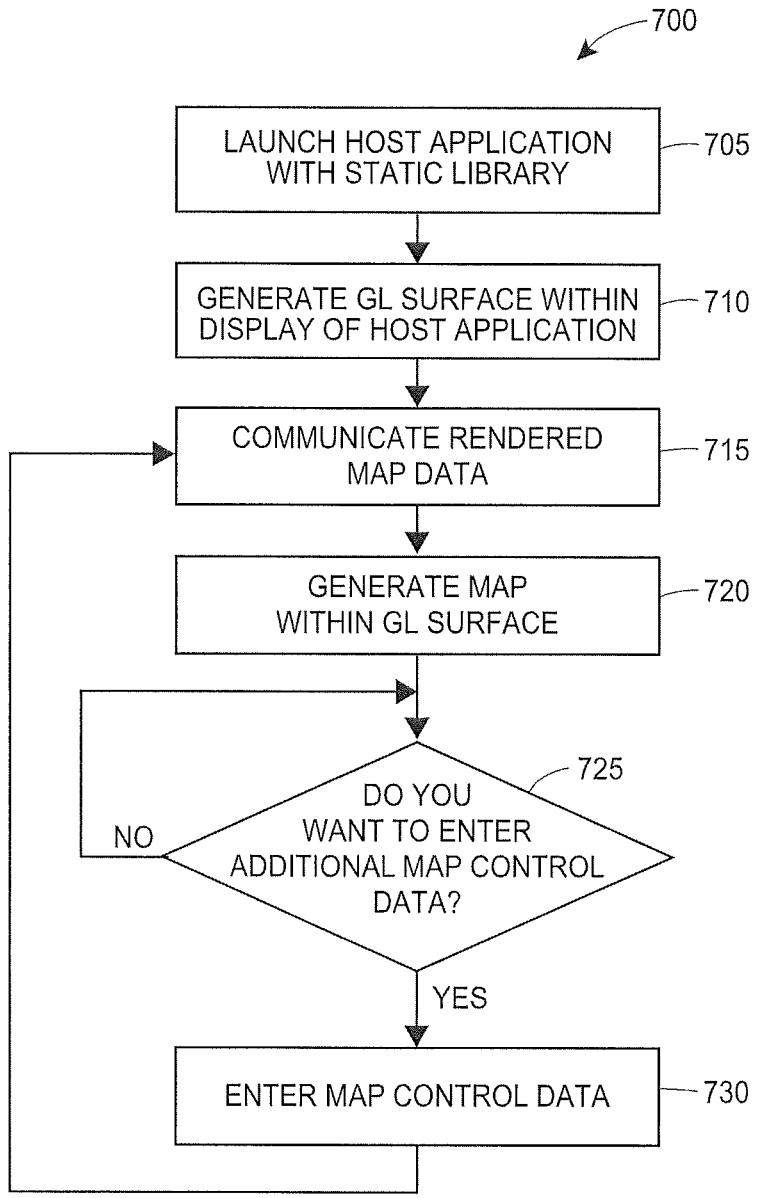
FIG. 7 depicts an example of a flow diagram for a method for rendering a map portion.

With reference now to FIG. 7, a flow diagram depicts a method 700 of incorporating the map portion 110 within a display 105 associated with a host application. The method 700 may be implemented within any suitable computing device, such as either of the client devices 205, 405 of FIG. 2 and FIG. 4, respectively. It should be understood that the modules 475-495 of FIG. 4 may be tangible computer-executable instructions stored on a memory and executed by a processor, similar to processor 225 of FIG. 2, to implement the method 700.

The processor 225 may launch a host application (e.g., host application associated with display 105 of FIG. 1) having a static library incorporated within the host application (block 705). The processor 225 may generate the map portion drawing surface 115 with a display 105 associated with the host application (block 710). The processor 225 may communicate rendered map portion data 320 from a rendering engine 500 to the host application with static library (block 715). The processor 225 may draw the map portion 110 within the map portion drawing surface 115 using the rendered map portion data 320 (block 720). The processor 225 may retrieve interactive display control data 315 representative of user interaction with the interaction display portion 110 of display 105 (block 725). The processor 225 may determine if a user has interacted with the map portion 110 of display 105 (block 730). If the processor 225 determines that the user has not interacted with the map portion 110 of display 105 (block 730), the processor 225 returns to block 725. If he processor 225 determines that the user has interacted with the map 110 (block 730), the processor returns to block 715.

As a specific example, the processor 225, implementing a host application with static library and executing the modules 475-495 may: 1) set up the map portion drawing surface 115 (e.g., an OpenGL context) for drawing the map portion 110, 2) forward interactive display portion control command data 315 representative of all the events (such as touch) to a rendering application (e.g., rendering engine 500 of FIG. 5), 3) receive interactive display portion control command data 315 (e.g., rendering and drawing commands) from the render application 500 and draw the map portion 110 on the map portion drawing surface 115, and 4) provide a set of application programming interfaces (APIs) that forward corresponding draw calls to the renderer application 500 (e.g., an API to add a marker to an interactive geographic map).

Turning now to FIG. 8, a sequence diagram 800 is depicted having a static library 805 (e.g., an android application package file (APK)) interacting with a dynamic rendering application 810 (e.g., a buddy android application package file (APK)). As described above, the static library 805 may be incorporated within a host application (e.g., a host application which generates a display 105 of FIG. 1). The dynamic rendering application 810 may provide data (e.g., rendered map data 320 of FIG. 3), via the static library 805, to the host application. The host application, cooperating with the static library 805, may generate the map portion 110 within a display 105 using the data 320 provided by the dynamic rendering application 810.

With further reference to FIG. 8, the static library 805 may include an interactive drawing surface 815 (e.g., an OpenGL surfaceview) and a renderer proxy 820. The interactive drawing surface 815 may be implemented as the map portion drawing surface 115 of FIG. 1. The dynamic rendering application 810 may include a shared memory 825 and a rendering service 830 (e.g., a MapView service). The static library 805 begins a process of acquiring rendered map portion data 320 by, first, communicating user interactions (e.g., touch events on a corresponding touch screen display) from the interactive drawing surface 815 to the renderer proxy 820 via a touchEvent(e) function 835. Second, the static library 805 communicates the touchEvent(e) function 840 from the renderer proxy 820 to the rendering service 830 of the dynamic rendering application 810 using inter-process communications (IPC). Third, the interactive drawing surface 815 communicates a render(gl) function 845 to the renderer proxy 820. Fourth, the static library 805 communicates the render(gl) function 850 from the renderer proxy 820 to the rendering service 830 of the dynamic rendering application 810 using inter-process communication (IPC). In response to receiving the touchEvent(e) function 835 and the render(gl) function 845 from the static library 805, the rendering service 830 of the dynamic rendering application 810 retrieves map data 310 and creates rendered map data 320 using the retrieved map data 310. Fifth, the rendering service 830 communicates rendered map data 320 (e.g., serialized OpenGL commands) to the shared memory 825 via a writeData function 855. Sixth, the rendering service 830 of the dynamic rendering application 810 communicates a complete render( ) function 860 to the renderer proxy 820 of the static library 805 using inter-process communication (IPC). Seventh, the renderer proxy 820 communicates a readData( ) function 865 to the shared memory 825 and retrieves the rendered map data 320 from the shared memory 825. Last, the renderer proxy 820 draws the map portion 110 within the interactive drawing surface 815 (e.g., map portion drawing surface 115 of FIG. 1) based on the runGLCommands( ) function 870 and using the rendered map data 320.

Turning now to FIG. 9, a sequence diagram 900 is depicted having a static library 905 (e.g., an android application package file (APK)) and a dynamic rendering application 910 (e.g., buddy android application package file (APK)). Generally, the sequence diagram 900 represents a modification to a portion of the sequence diagram 800. In particularly, implementation of the sequence diagram 900 allows for communication of commands from the static library 905 to the dynamic rendering application 910 which require a response from the dynamic rendering application 910 (e.g., a glGetPointery command). Similar to the static library 805, the static library 905 may include an interactive drawing surface 915 (e.g., an OpenGL surfaceview) and a renderer proxy 920. Similar to the rendering application 810, the dynamic rendering application 910 may include a shared memory 925 and a rendering service 930 (e.g., a MapView service). The static library 905, first, communicates a render(gl) function 935 from the interactive drawing surface 915 to the renderer proxy 920. Second, the static library 915 communicates the render(gl) function 935 from the renderer proxy 920 to the rendering service 930 of the dynamic rendering application 910 using inter-process communications (IPC). In response to receiving the render (gl) function 935, the dynamic rendering application 910 retrieves map data 310 and creates rendered map data 320 using the retrieved map data 310. Third, the rendering service 930 communicates rendered map data 320 (e.g., serialized OpenGL commands) to the shared memory 925 via a writeData function 945. Fourth, the rendering service 930 of the dynamic rendering application 910 communicates a runCommands( ) function 950 to the renderer proxy 920 of the static library 905 using inter-process communication (IPC). Fifth, in response to receiving the runCommands( ) function 950 from the rendering service 930, the renderer proxy 920 of the static library 905 communicates a readData( ) function 955 to the shared memory 825 and retrieves the rendered map data 320 from the shared memory 825. Sixth, the renderer proxy 920 of the static library 905 draws the map portion 110 within the drawing surface 915 (e.g., map portion drawing surface 115 of FIG. 1) based on the runGLCommands( ) function 960 and using the rendered map data 320. Seventh, the renderer proxy 920 communicates a writeData (LastCommandResults) function 955 to the shared memory 925. Eighth, the render proxy 920 of the static library 905 communicates a Complete runCommands( ) function 970 to the rendering service 930 of the dynamic rendering application 910 using inter-process communication (IPC). Last, the rendering service 930 of the dynamic rendering application 910 communicates rendered map data 320 (e.g., serialized OpenGL commands) to the shared memory 925 via a writeData function 945.

Figure 10:
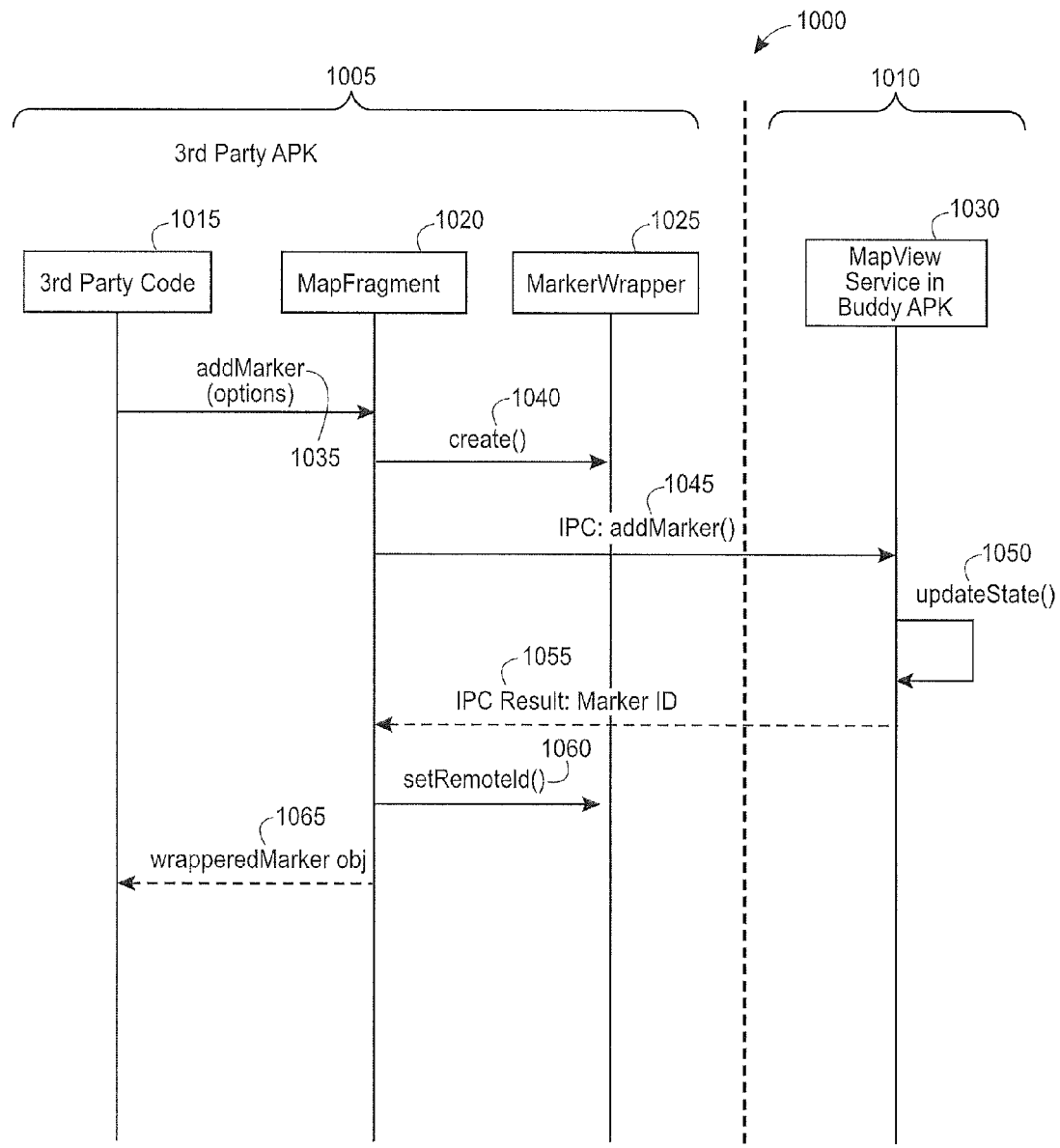

Turning now to FIG. 10, a sequence diagram 1000 is depicted having a host application with static library 1005 (e.g., an android application package file (APK)) and a dynamic rendering application 1010 (e.g., buddy android application package file (APK)). Generally, the sequence diagram 1000 represents an addition to the sequence diagram 800. In particular, implementation of the sequence diagram 1000 allows for addition of markers (e.g., highlighted areas) within the map portion 110. The host application with static library 1005 may include host application code 1015, map fragment portion 1020 and a marker wrapper portion 1025. Similar to the dynamic rendering application 810, the dynamic rendering application 1010 may include a rendering service 1030 (e.g., a MapView service). The host application with static library 1005 initiates generation of a marker by, first, communicating an addMarker(options) function 1035 from the host application code 1015 to the map fragment portion 1020. Second, the map fragment portion 1020 communicates a create( ) function 1040 to the marker wrapper portion 1025. Third, the map fragment portion 1020 of the static library 1005 communicates the addMarker( ) function 1045 to the rendering service 1030 of the rendering application 1010 using inter-process communication (IPC). Fourth, the rendering service 1030 of the rendering application 1010 implements the updateState( ) function 1050 that adds a marker to the rendered map data 320. Fifth, the rendering service 1030 of the rendering application 1010 communicates a Result: Marker ID function 1055 to the map fragment portion 1020 of the host application with static library 1005 using inter-process communication (IPC). Sixth, the map fragment portion 1020 communicates a setRemoteid( ) function 1060 to the marker wrapper portion 1025. Finally, the map fragment portion 1020 communicates a wrapperMarker obj function 1065 to the host application code 1015.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of the map generation system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for incorporating a map portion within a host application. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for incorporating interactive geographic map displays within interfaces of applications executing on a computing device, the method comprising:
   retrieving map data corresponding to a map portion from a map database via a computer network, the map data including specifications for a plurality of elements to display within the map portion;
   generating a set of commands using a map rendering module to render the map portion using the retrieved map data;
   generating a display rendering surface within a graphical interface of a host application executing on the computing device using instructions of a static library of a host application; and
   drawing the map portion within the display rendering surface using the set of commands and the instructions of the host application static library;
   wherein the map rendering module is stored in a first memory of the computing device and the host application with the static library is stored in a second memory of the computing device.

2. The method of claim 1, wherein the set of commands includes a plurality of OpenGL commands.

3. The method of claim 1, further comprising sending the set of commands to a shared memory between the map rendering module and the host application.

4. The method of claim 1, further comprising retrieving further map data corresponding to a further map portion from the map database via the computer network in response to receiving user input data indicative of user interaction with the drawn map portion.

5. A method for rendering a map within a host application by a rendering application, the method comprising:
   generating a display area within a user interface of a host application, wherein the host application is stored in a first memory of a computing device and includes a static library;
   generating a drawing surface within the display area of the host application area using the static library;
   rendering a map portion using a rendering application that is stored in a second memory of the computing device; and
   drawing the map portion within the drawing surface of the display area using the rendered map portion, wherein the host application and the rendering application cooperate to draw the map portion within the drawing surface of the display area.

6. The method of claim 1, further comprising:
   receiving user inputs, wherein the host application with static library and the rendering application further cooperate to generate the map portion in response to the received user inputs.

7. The method of claim 1, further comprising a plurality of host applications, wherein each host application includes a static library and wherein the static library of each of the plurality of host applications cooperates with the rendering application to generate the map portion associated with each host application.

8. The method of claim 1, wherein the rendering application includes a mapping application and the map portion includes an interactive geographic map.

9. The method of claim 1, wherein the host application with static library issues commands to the rendering application to initiate the rendering application to render the map portion and to provide data, representative of the rendered map portion, to the host application with static library.

10. The method of claim 9, wherein the host application with static library and the rendering application access a shared memory when at least one command issued by the host application with static library requires a response.

11. The method of claim 9, wherein the at least one command issued by the host application with static library includes incorporating a marker within the map portion.

12. A computing device configured for rendering a map portion within a user interface display, the computing device comprising:
   a display device configured to present the user interface display;
   a host application with static library module stored in a first memory of the computing device, the host application including instructions that, when executed on a processor of the computing device, generate a drawing surface within the user interface display using the static library module;
   a map rendering module stored in a second memory of the computing device, wherein the map rendering module includes instructions that, when executed on a processor of the computing device, render a map portion; and
   a map portion drawing module stored on the first memory that, when executed on a processor, draws the rendered map portion within the drawing surface of the display.

13. The computing device of claim 12, further comprising:
a map data retrieval module stored on a memory that, when executed on a processor, retrieves map data from a remote map database and the processor, further executing the map rendering module, renders the map portion using the retrieved map data.

14. The computing device of claim 13, wherein the map data includes data representative of an interactive geographic map.

15. The computing device of claim 12, further comprising:
a user input device and an user interaction module that, when executed on a processor, allows a user to interact with a host application via the map portion and the user input device.

16. The computing device of claim 15, wherein the user input device includes a touch screen display and events corresponding to user inputs initiate a static library within the host application to issue commands to a rendering application.

17. The computing device of claim 16, further comprising a shared memory, wherein at least one command issued by the host application with static library requires a response and the host application with static library and the rendering application access the shared memory to communicate the response in reaction to the at least one command.

18. A tangible non-transitory computer-readable medium including computer readable instructions stored thereon for incorporating a map portion within a display associated with a host application, the non-transitory computer-readable medium comprising:
a static library module that, when executed on a processor, generates a drawing surface within the display and transmits user-instructions to a module external to the non-transitory computer-readable medium, the instructions being an input to the external module for generating rendered map portion data;
a rendered map portion data retrieval module that, when executed on the processor, retrieves the rendered map portion data from the external module; and
a map portion drawing module that, when executed on the processor, draws a map portion within the drawing surface of the display using the rendered map portion data.

19. The tangible non-transitory computer-readable medium of claim 18, wherein the static library module transmits to the external module user-instructions generated based on user interaction with the displayed map portion.

20. The tangible non-transitory computer-readable medium of claim 19, wherein the static library module transmits at least one user-instruction to the external module via a shared memory and receives a response from the external module via the shared memory.

21. The tangible non-transitory computer-readable medium of claim 19, further comprising a first host application module that communicates with the static library module, the rendered map portion data retrieval module, and the map portion drawing module to draw the map portion on the display and a second host application module that uses a second static library module, a second rendered map portion data retrieval module, and a second map portion drawing module to draw a second map portion on the display, wherein the static library module of the first host application and the second static library module of the second host application transmits instructions to and receives rendered map portion data from the same external module.

22. The tangible non-transitory computer-readable medium of claim 21, wherein the map portion includes an interactive computer game display.

* * * * *